(12) United States Patent
Hwang

(10) Patent No.: US 10,056,584 B2
(45) Date of Patent: Aug. 21, 2018

(54) WATERPROOF BATTERY CASE

(71) Applicant: Steve Han Shi Hwang, New Taipei (TW)

(72) Inventor: Steve Han Shi Hwang, New Taipei (TW)

( * ) Notice: Subject to any disclaimer, the term of this patent is extended or adjusted under 35 U.S.C. 154(b) by 201 days.

(21) Appl. No.: 15/198,996

(22) Filed: Jun. 30, 2016

(65) Prior Publication Data

US 2017/0263902 A1     Sep. 14, 2017

(30) Foreign Application Priority Data

Mar. 9, 2016   (TW) .............................. 105203224 U

(51) Int. Cl.
   H01M 2/10        (2006.01)
   H01M 2/30        (2006.01)

(52) U.S. Cl.
   CPC ......... H01M 2/105 (2013.01); H01M 2/1094 (2013.01); H01M 2/30 (2013.01)

(58) Field of Classification Search
   CPC .... H01M 2/02; H01M 2/1055; H01M 2/1094; H01M 2/20; H01M 2/202; H01M 2/204; H01M 2/206; H01M 2/208; H01M 2/22; H01M 2/24; H01M 2/30; H01M 2/105
   See application file for complete search history.

(56) References Cited

U.S. PATENT DOCUMENTS 5,160,879 A * 11/1992 Tortola ................. H01M 2/105
                                                                320/111
2012/0114998 A1* 5/2012 Hwang ............... H01M 2/1055
                                                                429/99

FOREIGN PATENT DOCUMENTS

CN   201020609694.6   11/2010
GB   2485247          5/2012
TW   M401877          4/2011

* cited by examiner

*Primary Examiner* — Gregg Cantelmo
(74) *Attorney, Agent, or Firm* — Guice Patents PLLC

(57) ABSTRACT

A waterproof battery case comprises: a case body including a base and a top cover, wherein adjacent surfaces thereof are correspondingly formed with a flange and a recess in which an elastic sealing member is mounted, the base is formed with an accommodation space allowing at least one battery to be accommodated, a stepped engaging hole and a through hole are formed between the outer wall of the base and the accommodation space; an electrode plate set, including at least one anode contact and at least one cathode contact accommodated in the accommodation space; and a waterproof structure, including an elastic waterproof plug allowing two wires to be integrally embedded therein, wherein a plug head at one end thereof is formed with a neck part having the circumference formed with at least one convex rib, the other end thereof is formed with an engaging sheet sleeved with the engaging hole.

9 Claims, 4 Drawing Sheets

A-A

A-A

WATERPROOF BATTERY CASE

BACKGROUND OF THE INVENTION

1. Field of the Invention

The present invention relates to a battery case, especially to a waterproof battery case having waterproof and dustproof effects.

2. Description of Related Art

A dry battery has been invented and widely applied for many years. The dry battery allows electric power (DC power) to be stored in a columnar body and to be supplied when necessary. Unlike the conventional power source (AC power) which is fixed in a certain location, one feature of the dry battery is portable, thereby providing more convenience for the user to operate an electronic product.

As such, a device for accommodating batteries, such as a battery case, is developed, the accommodation and storage of batteries are sometimes combined with the electronic product, such as a toy, a hand-held radio set or a flashlight, but other electronic products may adopt a design of separating from the battery case.

The circuit designs of the battery cases are mostly in a serial connection, but a parallel connection can also be adopted in the battery case according to certain specification requirements. In actual practice, the battery cases would be used in an outdoor or humid environment, thus the waterproof function has become more important.

A conventional battery case includes a base and a cover engaged with each other, the interior of the base is installed with an anode electrode plate and a cathode electrode plate, and the engaging means of the base and the cover is a sliding means, and a wall surface of the base is formed with a wall hole allowing wires to penetrate. The battery case is in a relatively sealing status, but liquid or moisture can still enter the interior of the battery case through the gap formed between the base and the cover and the wall hole, so the battery may be in a short circuit status, the anode electrode plate and the cathode electrode plate would be rusted, thus the above-mentioned battery case is not suitable to be used in an outdoor or humid environment.

Based on the waterproof requirement, Taiwan Patent NO. M401877 (corresponding to China Patent Application NO. 201020609694.6 and GB Patent NO. 2485247) granted to the applicant of the present invention has disclosed a waterproof battery case. The waterproof battery case includes: a case body composed of a base and a top cover engaged with each other, wherein an elastic sealing member is disposed between adjacent surfaces of the base and the top cover, and a penetrated wall hole is formed on the case body; an electrode plate set composed of at least one anode contact and at least one cathode contact, wherein the anode and the cathode contacts are respectively connected to a wire and extended to the wall hole; and a sealing connector having a tubular main body allowing the wires to be received, wherein two sides of the main body are respectively formed with a first connection part and a second connection part, the second connection part is sleeved with an elastic sealing pad and inserted in the wall hole, then is fastened with a fastening member, the outer side of the first connection part is integrally extended for forming at least two arc-shaped clamping pieces arranged in an annular status, the interior of the arc-shaped clamping piece is sleeved with an elastic tightening ring allowing the wires to pass, and a tightening member allowing the wires to protrude is combined with the first connection part, so that the radial inner wall of the tightening member is able to press the arc-shaped clamping pieces for enabling the tightening ring to tighten the wires, thereby preventing liquid or dusts from entering the battery case.

The above-mentioned waterproof battery case is provided with excellent waterproof and dustproof effects, but the sealing connector is protruded from one side of the case body, so not only a harmonized appearance is not provided, the sealing connector may be broken due to an external impact which causes the waterproof effect no longer provided. Especially, the sealing connector is composed of many components, so the production cost cannot be lowered; thus, the above-mentioned disadvantages shall be improved.

SUMMARY OF THE INVENTION

One primary objective of the present invention is to provide a waterproof battery case, which includes a waterproof structure integrally formed with two wires and a waterproof plug, the waterproof plug is able to seal a hole formed on the battery case and allowing the wires the pass, so liquid, moisture or dusts can be prevented from entering the battery case, so that the normal DC power supply can be ensured, and the battery case is suitable to be used in an outdoor or humid environment.

Another objective of the present invention is to provide a waterproof battery case, in which the production cost of a waterproof structure is inexpensive and the waterproof structure is able to be in plane with the battery case, so the whole appearance can be harmonized and an accidental collision can be prevented, thereby ensuring the waterproof effect.

For achieved said objectives, one technical solution provided by the present invention is to provide a waterproof battery case, which comprises: a case body including a base having the top end combined with a top cover, wherein adjacent surfaces of the base and the top cover are correspondingly formed with a flange and a recess, the interior of the recess is mounted with an elastic sealing member allowing the flange to abut against and press, the interior of the base is formed with an accommodation space allowing at least one battery to be accommodated, and a stepped engaging hole and a through hole are formed between the outer wall of the base and the accommodation space; an electrode plate set, including at least one anode contact and at least one cathode contact accommodated in the accommodation space; and a waterproof structure, including an elastic waterproof plug allowing two wires to be integrally embedded therein, wherein a plug head at one end of the waterproof plug is concavely formed with a neck part having the circumference formed with at least one convex rib, and the other end thereof is formed with an engaging sheet adjacent to the neck part and sleeved with the engaging hole, the neck part is inserted in the through hole, so that the at least one convex rib is deformed due to being squeezed by the through hole, one end of each of the wires is respectively connected to the anode contact and the cathode contact, and the other end thereof is outwardly extended from the engaging sheet.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
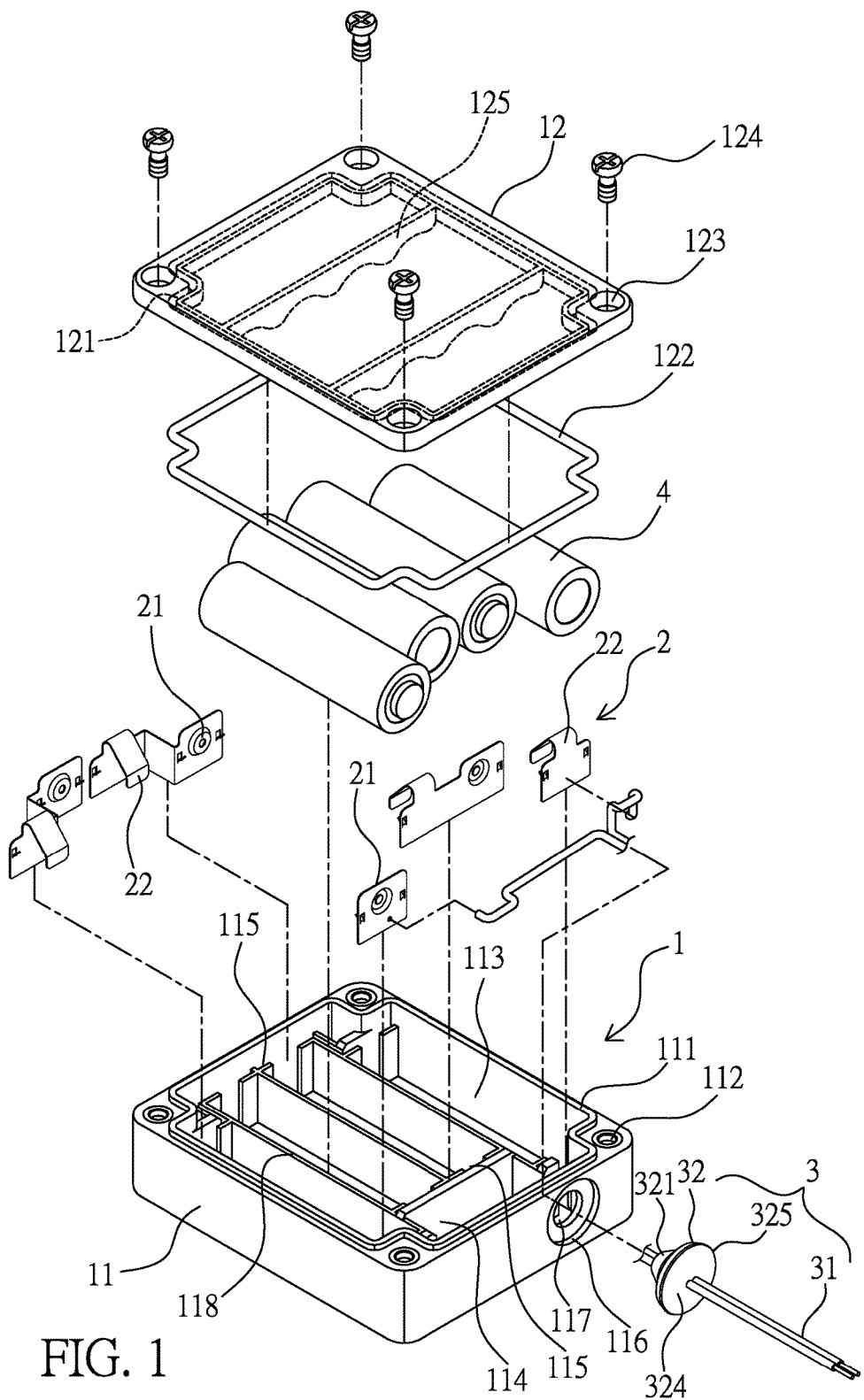
FIG. 1 is a perspective exploded view illustrating a waterproof battery case according to the present invention.

Referring from FIG. 1 to FIG. 4, the present invention provides a waterproof battery case, which comprises a case body 1, an electrode plate set 2 and a waterproof structure 3.

The case body 1 includes a base 11, and the top end thereof is combined with a top cover 12. For providing a sealing effect to the base 11 and the top cover 12, adjacent surfaces thereof are correspondingly formed with a flange 111 and a recess 121, the interior of the recess 121 is mounted with an elongated or circular elastic sealing member 122 made of an elastic polymer material. As such, when the base 11 is engaged with the top cover 12, the flange 111 is able to abut against and press the sealing member 122 in the recess 121 thereby forming a liquid sealing effect, so that liquid, moisture or ducts can be prevented from entering the case body 1.

As mentioned above, the flange 111 and the recess 121 are respectively formed on the top surface of the base 11 and the bottom surface of the top cover 12, but what shall be addressed is that the scope of the present invention is not limited to the above-mentioned arrangement, the flange and the recess can also be formed on the bottom surface of the top cover 12 and the top surface of the base 11, the elastic sealing member 122 is mounted in the recess on the top surface of the base 11, and the same liquid sealing effect can be provided.

The combining means for the base 11 and the top cover 12 is that the peripheries, such as four corners, of the connecting surfaces thereof are respectively formed with a screw hole 112 and a penetrated hole 123, so a conventional connecting member 124, such as a screw, can be utilized for passing each of the penetrate holes 123 and fastened in each of the screw holes 112. What shall be addresses is that the combining means for the base 11 and the top cover 12 is not limited to the above-mentioned arrangement, the peripheries of the connecting surfaces of the base 11 and the top cover 12 can also be correspondingly formed with at least one buckling hook and at least one buckling slot, and a buckling means is adopted for combining the base 11 and the top cover 12.

The interior of the base 11 is formed with an accommodation space 113, the accommodation space 113 is formed with two opposite inner walls 114 allowing at least one battery 4 to be installed, the pair of inner walls 114 are respectively formed with at least one insertion slot 115 for allowing at least one anode contact 21 and/or at least one cathode contact 22 to be mounted and positioned. A stepped engaging hole 116 and a through hole 117 communicated with each other are formed between the outer wall of the base 11 and the accommodation space 113. For separating two adjacent batteries 4, the two opposite inner walls 114 are vertically installed with at least one partition rib 118 with respect to the dimension of the battery 4. The inner wall of the top cover 12 is protrudingly installed with at least one pressing strip 125 in a direction perpendicular to the at least one battery 4, thereby preventing the at least one battery 4 from longitudinally shaking.

Figure 2:
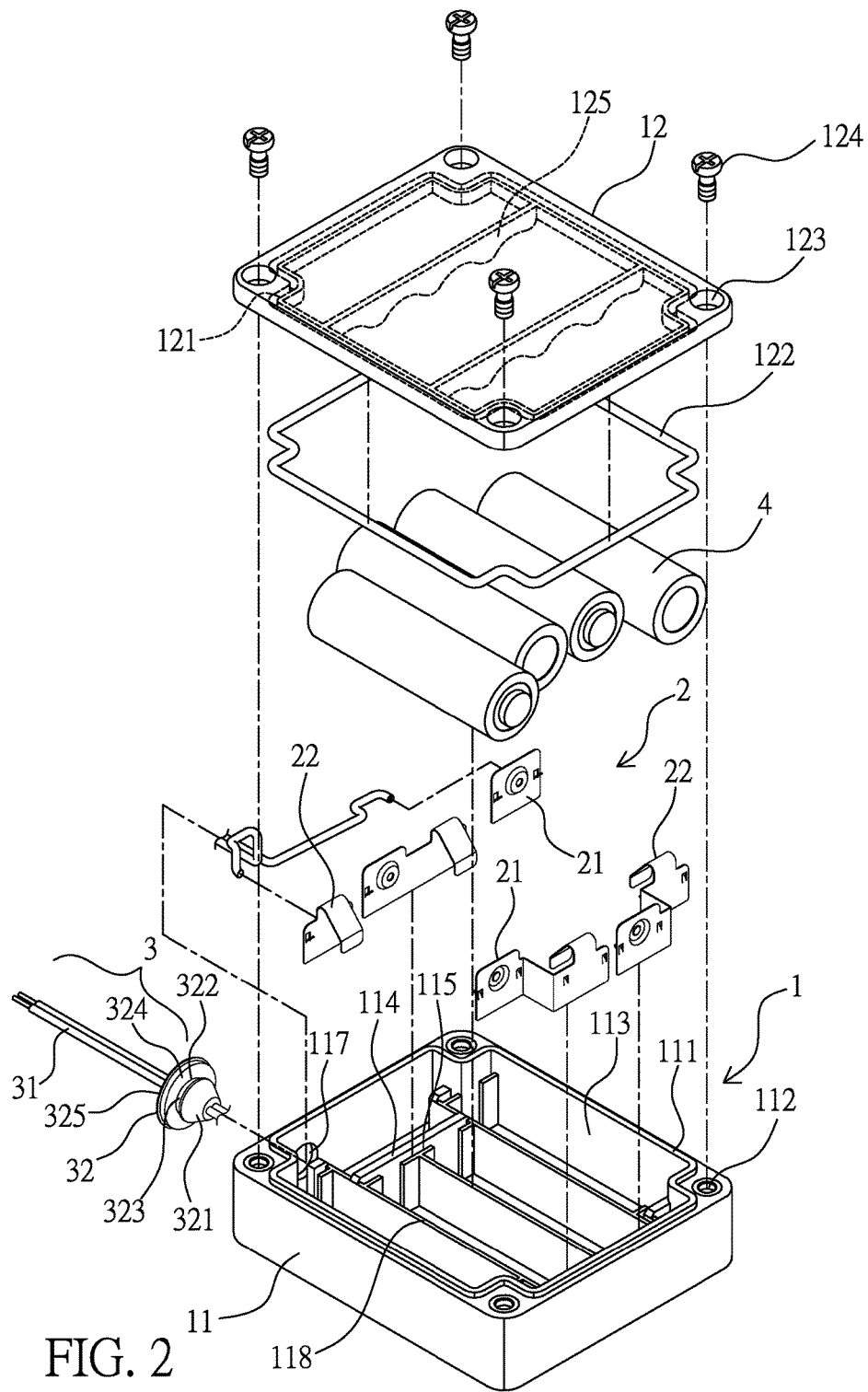
FIG. 2 is another perspective exploded view illustrating a waterproof battery case according to the present invention.

The electrode plate set 2 includes the at least one anode contact 21 and the at least one cathode contact 22. As shown in FIG. 1 and FIG. 2, the interior of the base 11 allows four batteries 4 to be accommodated and arranged in parallel, but what shall be addressed is that the scope of the present invention is not limited to the above-mentioned arrangement, the interior of the base 11 can allow more than four or less than four batteries 4 to be accommodated and arranged in parallel according to the actual power supply requirement. For establishing a serially connecting effect, the anode contacts 21 and the cathode contacts 22 at the inner sides of the inner walls 114 are staggeringly arranged for forming a circuit connection. However, the installing means of the electrode plate set 2 is a conventional means, and the arrangement of the anode contacts and the cathode contacts and the connection in series or in parallel are not the features to be disclosed in the present invention, therefore no further illustration is provided.

The waterproof structure 3 is formed through disposing two wires 31 in a mold, and a waterproof plug 32 made of an elastic polymer material being ejected and mounted in a low temperature for allowing the wires 31 to be integrally embedded in the waterproof plug 32. A plug head 321 at one end of the waterproof plug 32 is concavely formed with a neck part 322 having the circumference formed with at least one convex rib 323, and the other end thereof is formed with an engaging sheet 324 adjacent to the neck part 322, and the periphery of the engaging sheet 324 is further formed with a cover edge 325 having a thinner thickness. Wherein, the shape of the plug head 321 is preferably to be conical, so that the plug head 321 can be easily inserted in the through hole 117.

When the waterproof structure 3 and the case body 1 are assembled, the wires 31 and the plug head 321 are firstly passed the engaging hole 116, and the neck part 322 is inserted in the through hole 117, so that the at least one convex rib 323 is deformed due to being squeezed by the through hole 117, thereby forming a first liquid sealing effect, and the engaging sheet 324 is sleeved in the engaging hole 116, the cover edge 325 is tightly engaged with the outer wall of the base 11 and served to shield the engaging hole 116, thereby forming a second liquid sealing effect, and the outer surface of the waterproof plug 32 is able to be in plane with or slightly protrude from the outer surface of the case body 1 according to the actual needs, so the whole appearance can be harmonized and an accidental collision can be prevented. For enhancing the combination tightness of the waterproof plug 32 and the case body 1, the engaging sheet 324 and the inner surface of the cover edge 325 are coated with an adhesive for being adhered in the engaging hole 116 and the outer surface of the case body 1.

Lastly, the two wires 31 inside the accommodation space 113 are respectively connected, such as welded, to the anode contact 21 and the cathode contact 22, thereby forming a circuit connection, and the two wires 31 protruded from the engaging sheet 324 are connected to an electronic product.

Figure 3:
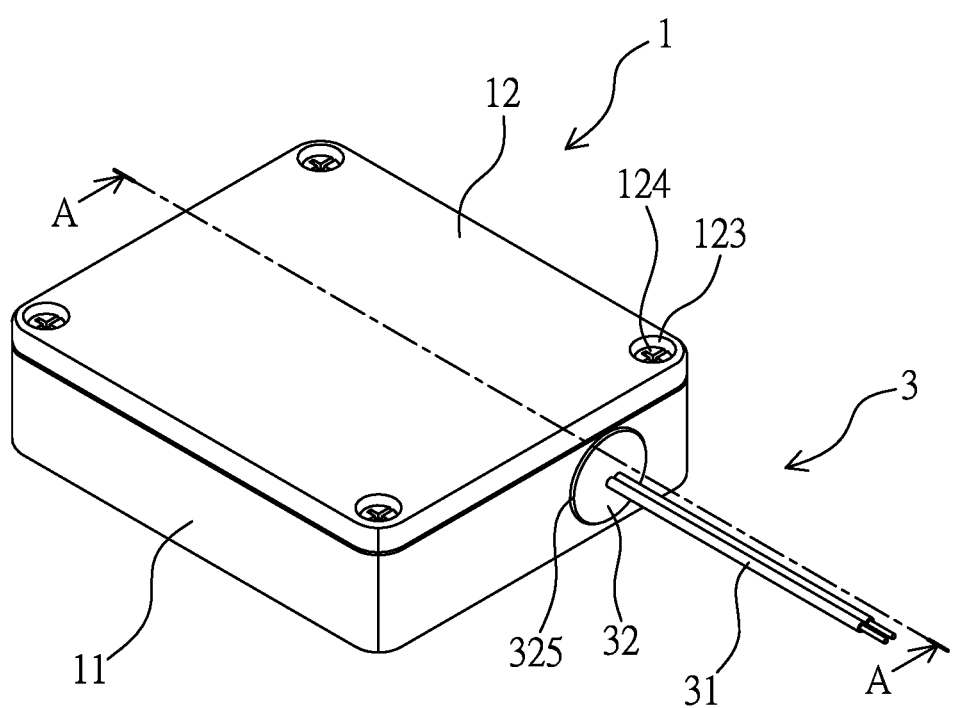
FIG. 3 is a perspective view illustrating the assembly of the waterproof battery case shown in FIG. 1 and FIG. 2 according to the present invention.
Figure 4:
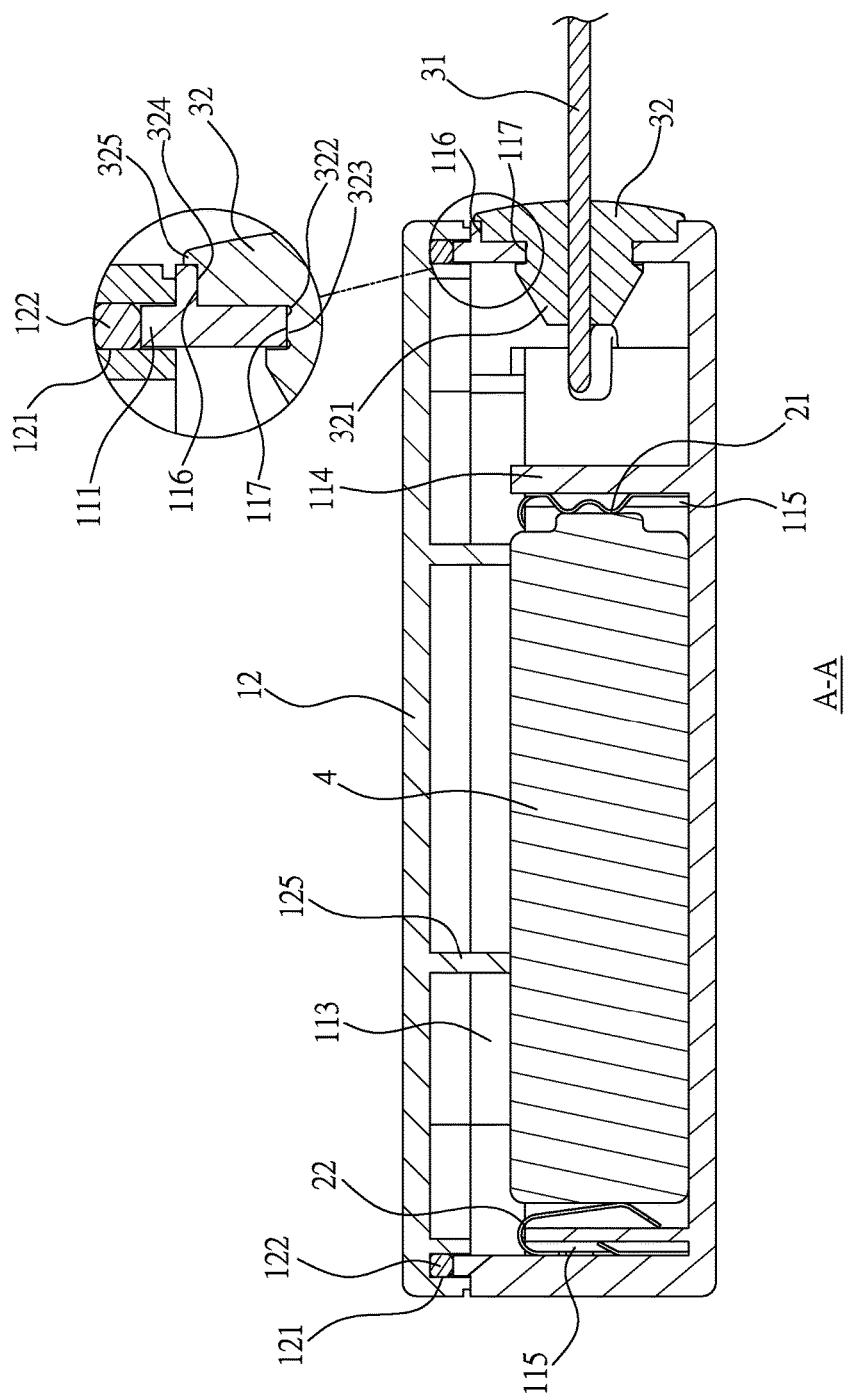
FIG. 4 is a cross sectional view taken along an A-A line of FIG. 3 according to the present invention.

As shown in FIG. 3 and FIG. 4, which are a perspective view and a cross sectional view illustrating the assembly of the waterproof battery case according to the present invention; with the multiple sealing effects provided by the sealing member 122 of the top cover 12 and the base 11, the through hole 117 and the neck part 322, and the engaging hole 116 and the engaging sheet 324, liquid, moisture or dusts can be effectively prevented from entering the case body 1, so that the normal power supply can be ensured, the electrode plate set can be protected from rusting, and the waterproof battery case provided by the present invention is suitable to be used in an outdoor or humid environment.

Moreover, according to the actual test, the ingress protection (IP) level of the waterproof battery case of the present invention is IP65, so that better dustproof and waterproof effects can be provided.

Based on what has been disclosed above, advantages achieved by the present invention are as followings: by installing the elastic sealing member between the base and the top cover, the case body and the waterproof plug, and the waterproof plug and the two wires, liquid, moisture or dusts can be prevented from entering the case body, so that the normal power supply can be ensured, the electrode plate set can be protected from rusting, the service life of the battery case can be prolonged, and the waterproof battery case is suitable to be used in an outdoor or humid environment; moreover, the production cost of the waterproof plug is inexpensive and the waterproof plug is able to be in plane with or slightly protruded from the outer wall of the case body, so the whole appearance can be harmonized and an accidental collision can be prevented. Accordingly, the waterproof battery case provided by the present invention is novel and more practical in use comparing to prior art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A waterproof battery case, comprising:
   a case body, including a base having the top end combined with a top cover, wherein adjacent surfaces of said base and said top cover are correspondingly formed with a flange and a recess, the interior of said recess is mounted with an elastic sealing member allowing said flange to abut against and press, the interior of said base is formed with an accommodation space allowing at least one battery to be accommodated, and a stepped engaging hole and a through hole are formed between an outer wall of said base and said accommodation space;
   an electrode plate set, including at least one anode contact and at least one cathode contact accommodated in said accommodation space; and
   a waterproof structure, including an elastic waterproof plug allowing two wires to be integrally embedded therein, wherein a plug head at one end of said waterproof plug is concavely formed with a neck part having the circumference formed with at least one convex rib, and the other end thereof is formed with an engaging sheet adjacent to said neck part and sleeved with said engaging hole, said neck part is inserted in said through hole, so that said at least one convex rib is deformed due to being squeezed by said through hole, one end of each of said wires is respectively connected to said anode contact and said cathode contact, and the other end thereof is outwardly extended from said engaging sheet;
   wherein the periphery of said engaging sheet is further formed with a cover edge having a thinner thickness and tightly engaged with said outer wall of said base.

2. The waterproof battery case as claimed in claim 1, wherein said engaging sheet and the inner surface of said cover edge are coated with an adhesive for being respectively adhered in said engaging hole and on the outer surface of said base.

3. The waterproof battery case as claimed in claim 1, wherein the shape of said plug head is conical.

4. The waterproof battery case as claimed in claim 1, wherein said flange and said recess are respectively formed on the top surface of said base and the bottom surface of said top cover.

5. The waterproof battery case as claimed in claim 1, wherein said flange and said recess are respectively formed on the bottom surface of said top cover and the top surface of said base.

6. The waterproof battery case as claimed in claim 1, wherein the peripheries defined on connecting surfaces of said top cover and said base are respectively formed with at least one penetrated hole and at least one screw hole, and a screw is utilized for passing said penetrate hole and fastened in said screw hole.

7. The waterproof battery case as claimed in claim 1, wherein the peripheries defined on connecting surfaces of said top cover and said base are correspondingly formed with at least one buckling hook and at least one buckling slot allowing said at least one buckling hook to be buckled.

8. The waterproof battery case as claimed in claim 1, wherein said accommodation space is formed with two opposite inner walls, the inner sides of said pair of inner walls are respectively formed with at least one insertion slot for allowing said at least one anode contact and/or said at least one cathode contact to be mounted and positioned.

9. The waterproof battery case as claimed in claim 8, wherein said pair of inner walls is vertically installed with at least one partition rib with respect to the dimension of said at least one battery.

* * * * *